United States Patent
Koellner

[19]

[11] Patent Number: 6,054,165
[45] Date of Patent: Apr. 25, 2000

[54] PROCESS AND APPARATUS FOR COOLING HIGH-VISCOSITY SAUCES CONTAINING INGREDIENTS IN THE FORM OF SOLID PIECES

[75] Inventor: Friedrich Koellner, Hess. Oldendorf, Germany

[73] Assignee: A. Stephan U. Soehne GmbH & Co., Hameln, Germany

[21] Appl. No.: 09/215,251

[22] Filed: Dec. 18, 1998

[30] Foreign Application Priority Data

Dec. 20, 1997 [DE] Germany .................... 197 57 134

[51] Int. Cl.$^7$ ........................................ A23L 3/00
[52] U.S. Cl. ................. 426/524; 62/100; 62/268; 99/472
[58] Field of Search .................. 426/524, 589; 62/100, 268; 99/472, 473

[56] References Cited

U.S. PATENT DOCUMENTS

| | | | |
|---|---|---|---|
| 4,942,053 | 7/1990 | Franklin et al. | 426/524 |
| 5,085,882 | 2/1992 | Rausing | 426/524 |

FOREIGN PATENT DOCUMENTS 2 595 916  9/1987  France .

OTHER PUBLICATIONS

Knochenhauer, H.: "Quasi–kontinuierlich". Herstelling von Feinkostobeen im Kombinationsverfahren. In: Lebensmitteltechnik 1996, Seiten 143 bis 15.

*Primary Examiner*—George C. Yeung
*Attorney, Agent, or Firm*—Foley & Lardner

[57] ABSTRACT

The invention relates to a process and an apparatus for cooling high-viscosity sauces containing ingredients in the form of solid pieces. To develop a virtually continues process while preserving the ingredients in piece form as much as possible, according to the invention the following process steps are proposed:

a) the sauce prepared at a temperature of 75° to 120° C. is pumped via a cooling system and is thereby cooled to a temperature of about 50° to 55° C.;

b) the sauce pre-cooled in this way is pumped into a cooling tank under vacuum, which it passes through under the force of gravity, partly via enforced diversions and partly in free fall, the sauce being cooled by water evaporation to a temperature of about 3° C. to 17° C.;

c) the cooled sauce collecting on the bottom of the tank is let out in batches every 5 to 10 minutes into a pre-evacuated sluice tank;

d) sterile air is then admitted to the sluice tank which is subjected to superatmospheric pressure of about 1 bar, which forces the sauce into the intake region of a pump which pumps the sauce on for its further processing.

11 Claims, 1 Drawing Sheet

PROCESS AND APPARATUS FOR COOLING HIGH-VISCOSITY SAUCES CONTAINING INGREDIENTS IN THE FORM OF SOLID PIECES

BACKGROUND OF THE INVENTION

1. Field of the Invention

The present invention relates to processes and apparatus for cooling high viscosity sauces containing ingredients in the form of solid pieces.

2. Description of the Related Art

It is generally known to cool low-viscosity food products using vacuum vapor evaporation. However, this process can generally only be used to a limited extent for high-viscosity food product, since on the one hand, the thin evaporation layer necessary for the vacuum cooling often cannot be achieved and on the other hand, the ingredients in piece form can be damaged by mechanical processes and, as a result, the overall quality is reduced.

It has typically been the practice until now for high-viscosity sauces containing ingredients in the form of solid pieces, such as vegetable, fruit or meat for example, to be manually discharged by filling the sauces into plastic containers, with a capacity of about 10 kg, at a temperature of about 80° C. These plastic containers are then cooled in a cooling chamber at a temperature of +3° C. for about 48 hours. In this operation, filling, cooling, discharging and cleaning the containers represent considerable work.

Continuously operating systems such as scraped surface coolers (liquid-cooled tubes with mechanical internal scraping devices) have generally not proven to be successful for sauces containing ingredients in the form of solid pieces, since the strong mechanical scraping action has the effect that, depending on the ingredients in piece form used, the end product becomes a uniform paste, which does not meet customer requirements in many instances.

Cooling by using tube cooling systems is also generally not possible, since the desired low temperature of +3° C. and the necessary high viscosity of the sauces of up to 22 Pas can cause the multitube cooler to freeze up. What is more, the ingredients in piece form are also damaged by the high pump pressures necessary in the cooling of high-viscosity sauces in tube systems.

SUMMARY OF THE INVENTION

The present invention was based, inter alia, on an object of developing a process and apparatus for cooling high-viscosity sauces containing ingredients in the form of solid pieces while preserving the solid pieces as much as possible.

In accordance with these and other objects, there is provided a process for cooling high-viscosity sauces containing ingredients in the form of solid pieces, comprising:

a) preparing a sauce at a temperature of 75° to 120° C. and pumping the sauce via a cooling system, thereby cooling the sauce preferably to a temperature of about 50° C. to 55° C. to form a pre-cooled sauce;

b) pumping the pre-cooled sauce into a cooling tank under vacuum, which the sauce passes through under the force of gravity, optionally partly via enforced diversions and partly in free fall, and wherein the sauce is cooled by water evaporation to a temperature of about 3° C. to 17° C. to form cooled sauce;

c) collecting the cooled sauce on the bottom of the cooling tank and letting out the cooled sauce in batches preferably every 5 to 10 minutes into a pre-evacuated sluice tank;

d) admitting sterile air to the sluice tank which is subjected to superatmospheric pressure of about 1 bar, so as to force the sauce into an intake region of a pump which pumps the sauce to further processing.

In yet further accordance with these and other objects, there is also provided an apparatus for cooling high-viscosity sauces containing ingredients in the form of solid pieces, comprising:

a) a multitube cooler for pre-cooling the sauce;

b) a cooling tower arranged downstream of the multitube cooler, including an upper sauce inlet, a discharge valve provided in a bottom portion thereof and built-in baffles;

c) a system for creating a vacuum in the cooling tower;

d) a sluice tank connected to the discharge valve including a valve-controlled connection to permit pre-evacuation thereof, a valve-controlled connection for admitting sterile air and a connected suction nozzle of a downstream product pump.

DETAILED DESCRIPTION OF THE DRAWING

Figure 1:
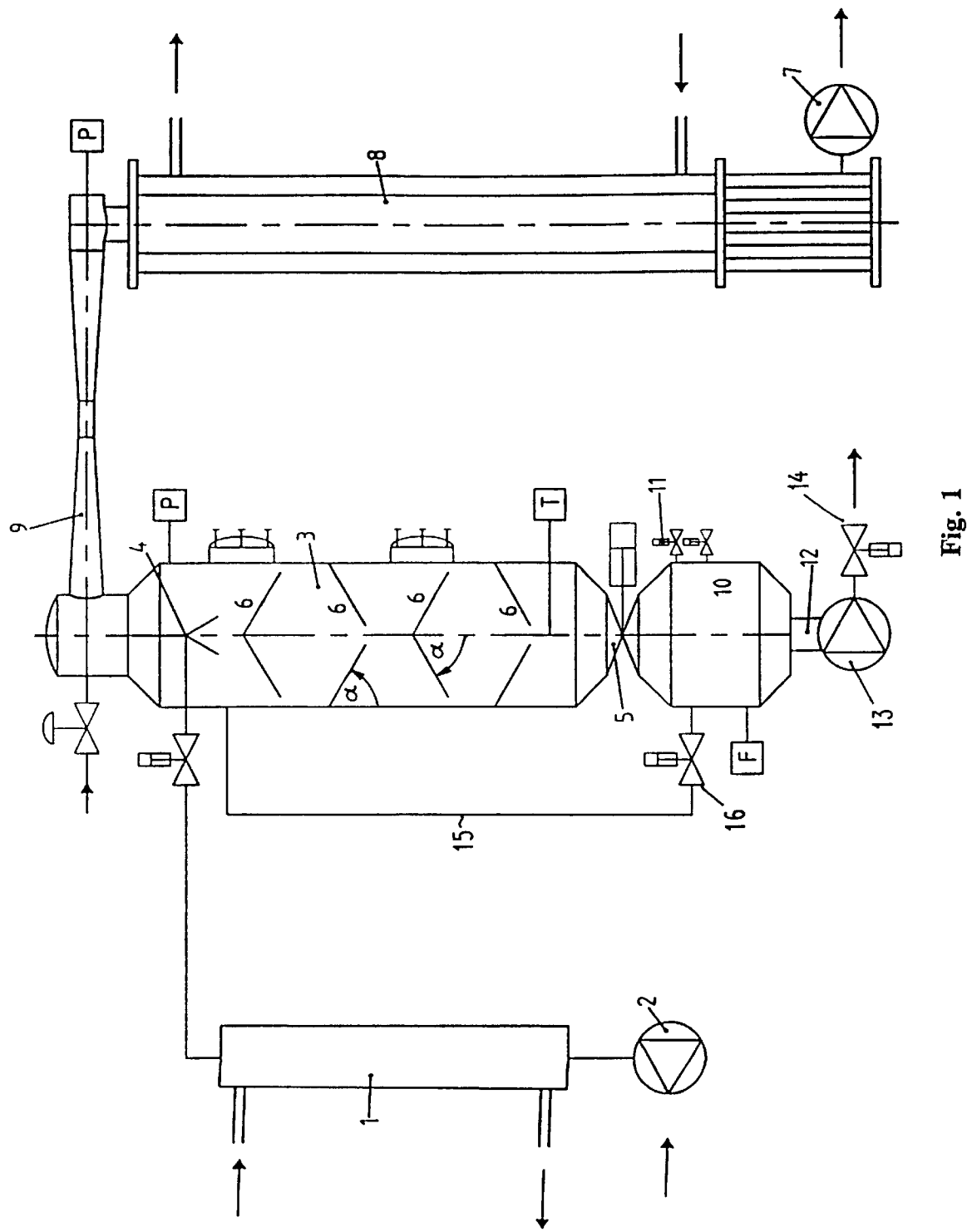

FIG. 1 is a diagram of process and apparatus according to the present invention.

The accompanying drawings, which are incorporated in and constitute a part of the specification, illustrate a presently preferred embodiment of the invention, and, together with the general description given above and the detailed description of the preferred embodiment given below, serve to explain the principles of the invention.

DESCRIPTION OF THE PREFERRED EMBODIMENT

These objects are achieved with respect to the process by the following process steps that are preferably carried out one after the other:

a) the sauce prepared at a temperature of 75° to 120° C. is pumped via a cooling system and is thereby cooled to a temperature of about 50° to 55° C.;

b) the sauce pre-cooled in this way is pumped into a cooling tank under vacuum, which it passes through under the force of gravity, partly via enforced diversions and partly in free fall, the sauce being cooled by water evaporation to a temperature of about 3° C. to 17° C.;

c) the cooled sauce collecting on the bottom of the tank is let out in batches every 5 to 10 minutes into a pre-evacuated sluice tank;

d) sterile air is then admitted to the sluice tank which is subjected to superatmospheric pressure of about 1 bar, which forces the sauce into the intake region of a pump which pumps the sauce on for its further processing.

With respect to the apparatus, these objects on which the present invention are based is achieved inter alia, by the following features:

a) a multitube cooler for pre-cooling the sauce;

b) a cooling tower arranged downstream of the multitube cooler, having an upper sauce inlet, a discharge valve provided in its bottom and built-in baffles;

c) a system creating a vacuum in the cooling tower;

d) a sluice tank connected to the discharge valve, having a valve-controlled connection for its pre-evacuation, a valve-controlled connection for sterile air and a connected suction nozzle of a downstream product pump.

To develop a virtually continuous process while preserving the ingredients in piece form as much as possible, according to the invention the following process steps are proposed:

a) the sauce prepared at a temperature of 75° to 120° C. is pumped via a cooling system and is thereby cooled to a temperature of about 50° to 55° C.;

b) the sauce pre-cooled in this way is pumped into a cooling tank under vacuum, which it passes through under the force of gravity, partly via enforced diversions and partly in free fall, the sauce being cooled by water evaporation to a temperature of about 3° C. to 17° C.;

the cooled sauce collecting on the bottom of the tank is let out in batches every 5 to 10 minutes into a pre-evacuated sluice tank;

d) sterile air is then admitted to the sluice tank which is subjected to superatmospheric pressure of about 1 bar, which forces the sauce into the intake region of a pump which pumps the sauce on for its further processing.

A process according to the present invention is consequently preferably based on the evaporation of water in a vacuum of up to 2 mbar absolute pressure and an associated cooling of the sauce in virtually continuous operation. The cooling tank as designed here preferably comprises a flash vessel, so that the level of the vacuum can be regulated depending on the desired product temperature. It may be expedient in some instances to interrupt the supply of sauce into the cooling tank while the sauce is being discharged in batch mode (for which reason mention was made above of "virtually continuous operation").

For the pre-evacuation of the sluice tank, it may be expedient if the sluice tank is connected via a valve-controlled connecting line to the cooling tank, the connecting line representing a bypass with respect to the discharge valve of the cooling tower.

The sauce pumped into the cooling tank preferably slides downward over baffles and partly in free fall, the baffles being set according to the viscosity of the sauce, preferably with varying steepness. The cooling of the sauce can take place by water evaporation while running over the baffles and while dripping off in free fall and on the bottom of the cooling tower. The cooled sauce can be initially collected on the bottom of the tank in a quantity of about 50 to about 100 kg. After about 5 to 10 minutes, this supply of sauce is preferably interrupted for about 30 seconds; the collected, cooled sauce is then let out into the pre-evacuated sluice tank via a discharge valve of large dimensions. After closing the discharge valve, the supply of sauce into the cooling tank can be resumed.

Before the sluice tank is filled each time, sterile air can be admitted to it and it is then preferably subjected to super-atmospheric pressure of about 1 bar. As a result, the high-viscosity sauce can be forced into the suction nozzle of the downstream product pump and can then be pumped on for further processing, for example with the aid of a rotary piston pump.

The sauce let out of the cooling tower can be forced directly into the sluice tank or the intake region of the downstream product pump. To avoid cross-sectional constrictions the intake region of this product pump, a shut-off valve is preferably arranged downstream of the pump.

Further features of the invention are the subject of the subclaims and are explained in more detail with further advantages of the invention on the basis of an exemplary embodiment.

In FIG. 1, a sauce cooling apparatus is diagrammatically represented.

The apparatus represented comprises a multitube cooler 1, upstream of which a pump 2 is arranged and downstream of which a cooling tower 3 is arranged. The cooling tower 3 has an upper sauce inlet 4, a sauce discharge valve 5 of large dimensions provided in its bottom and built-in baffles 6. The latter are adjustable in their setting angle α.

Connected to the cooling tower 3 is a system which creates a vacuum in the tower 3 and comprises a liquid-ring pump 7 with a condenser 8 and an upstream steam-jet pump 9.

Connected to the discharge valve 5 of the cooling tower 3 is a sluice tank 10, which is equipped with a valve-controlled connection 11 for sterile air and has at its lower end a connected suction nozzle 12 of a downstream product pump 13, downstream of which a shut-off valve 14 is preferably arranged.

Before filling each time, the sluice tank 10 is preferably subjected to a pre-evacuation. For this purpose, the sluice tank 10 is connected to the cooling tower 3 via a connecting line 15, bypassing the discharge valve 5.

After discharging from the sluice tank 10 by means of the product pump 13, the valve 14 arranged downstream of it is generally closed; and a shut-off valve 16 connected in the connecting line 15 is opened. The connection thereby established between the sluice tank 10 and the cooling tower 3 then has the effect that the sluice tank 10 is likewise evacuated. After about 30 seconds, the discharge valve 5 can be opened and the sauce in the cooling tower 3 can be let out into the sluice tank 10. Once the discharge operation has been completed, the discharge valve 5 and the shut-off valve 16 are typically closed again. The cooling process in the cooling tower 3 can then be continued. Sterile air can be admitted to the sluice tank 10 by opening the valve 11; after opening the valve 14, the sauce can be fed to a consuming or storing station by means of the product pump 13. In this process sequence, the sauce let out from the cooling tower 3 can be forced directly into the sluice tank 10 or the intake region of the downstream product pump 13. To avoid cross-sectional constrictions in the intake region of the product pump 13 a shut-off valve 14 is preferably provided downstream of the product pump 13. In FIG. 1, F denotes a filing level sensor, P denotes pressure sensors and T denotes a temperature sensor.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

We claim:

1. A process for cooling high-viscosity sauces containing ingredients in the form of solid pieces, comprising:

a) preparing a high-viscosity sauce containing solid ingredient pieces at a temperature of 75° to 120° C. and pumping said sauce via a cooling system, thereby cooling said sauce to form a pre-cooled sauce;

b) pumping the pre-cooled sauce into a cooling tank under vacuum, which said sauce passes through under the force of gravity, and wherein the sauce is cooled by water evaporation to a desired product temperature of about 3° C. to 17° C. to form cooled sauce;

c) collecting cooled sauce on the bottom of the cooling tank and letting out said cooled sauce in batches into a pre-evacuated sluice tank;

d) admitting sterile air to the sluice tank which is subjected to superatmospheric pressure of about 1 bar, so as to force the sauce into an intake region of a pump which pumps the sauce to further processing.

2. The process as claimed in claim 1, further comprising regulating the vacuum level in the cooling tank according to the desired product temperature.

3. The process as claimed in claim 1, wherein the supply of sauce into the cooling tank is interrupted while said sauce is being discharged in a batch mode.

4. The process as claimed in claim 1, wherein, each time after said sauce discharges from said sluice tank, the sluice tank is connected to the cooling tank for pre-evacuation.

5. The process according to claim 1, wherein said pre-cooled sauce is formed by cooling to a temperature of about 50° C. to 55° C.

6. The process according to claim 1, wherein said sauce passes through said cooling tank partly via enforced diversions and partly in free fall.

7. The process according to claim 1, wherein said cooled sauce is let into said sauce tank every 5 to 10 minutes.

8. An apparatus for cooling high-viscosity sauces containing ingredients in the form of solid pieces, comprising:
   a) a multitube cooler for pre-cooling a high viscosity sauce containing solid ingredient pieces;
   b) a cooling tower arranged downstream of the multitube cooler, including an upper sauce inlet, a discharge valve provided in a bottom portion thereof and built-in baffles;
   c) a system for creating a vacuum in the cooling tower;
   d) a sluice tank connected to the discharge valve including a valve-controlled connection to permit pre-evacuation thereof, a valve-controlled connection for admitting sterile air and a connected suction nozzle of a downstream product pump.

9. The apparatus as claimed in claim 8, wherein the baffles arranged in the cooling tower are adjustable with respect to their inclination.

10. The apparatus as claimed in claim 8, wherein said vacuum system comprises a liquid-ring pump with a condenser and an upstream steam-jet pump.

11. The apparatus as claimed in claim 8, wherein the valve-controlled connection comprises a connecting line which connects the sluice tank to the cooling tank and includes a shut-off valve.

* * * * *